(12) United States Patent
Mah

(10) Patent No.: US 6,202,343 B1
(45) Date of Patent: Mar. 20, 2001

(54) PORTABLE ELECTRIC VACUUM WIRED TO TERMINATE AND DISPOSE OF PESTS

(75) Inventor: Pat Y. Mah, Hong Kong (HK)

(73) Assignee: DAKA Development Ltd., Kowloon (HK)

( * ) Notice: Subject to any disclaimer, the term of this patent is extended or adjusted under 35 U.S.C. 154(b) by 0 days.

(21) Appl. No.: 09/241,565

(22) Filed: Feb. 1, 1999

(51) Int. Cl.[7] .............................. A01M 1/06; A01M 1/22
(52) U.S. Cl. ............................................. 43/139; 43/112
(58) Field of Search ................................. 43/112, 139

(56) References Cited

U.S. PATENT DOCUMENTS

| | | | |
|---|---|---|---|
| 923,368 | * 6/1909 | Myser | 43/139 |
| 1,055,620 | * 3/1913 | Edgar | 43/139 |
| 1,583,975 | * 5/1926 | Hunt | 43/139 |
| 1,807,076 | * 5/1931 | Sweet | 43/139 |
| 2,567,616 | * 9/1951 | Moore | 43/139 |
| 2,637,408 | * 5/1953 | Yadoff | 43/112 |
| 3,214,861 | * 11/1965 | Arther | 43/139 |
| 3,319,374 | * 5/1967 | Gawne | 43/112 |
| 3,330,063 | * 7/1967 | Lockwood | 43/139 |
| 4,074,458 | * 2/1978 | Catlett | 43/139 |
| 4,175,352 | * 11/1979 | Catlett | 43/139 |
| 4,625,453 | * 12/1986 | Smith | 43/139 |
| 4,858,376 | * 8/1989 | Reed | 43/139 |
| 4,908,978 | * 3/1990 | Zacharias | 43/112 |
| 4,918,857 | * 4/1990 | Wade et al. | 43/139 |
| 4,979,330 | * 12/1990 | Rorant | 43/139 |
| 5,004,446 | * 4/1991 | Guong-hong | 43/139 |
| 5,020,270 | * 6/1991 | Lo | 43/112 |
| 5,040,326 | * 8/1991 | Van Dijnsen et al. | 43/139 |
| 5,052,147 | * 10/1991 | Broomfield et al. | 43/139 |
| 5,222,322 | * 6/1993 | Mastomonaco | 43/139 |
| 5,241,779 | * 9/1993 | Lee | 43/139 |
| 5,255,468 | 10/1993 | Cheshire | 43/113 |
| 5,301,458 | * 4/1994 | Deyoreo et al. | 43/139 |
| 5,367,821 | * 11/1994 | Ott | 43/139 |
| 5,402,598 | * 4/1995 | Wade et al. | 43/139 |
| 5,595,018 | * 1/1997 | Wilbanks | 43/112 |
| 5,870,851 | * 2/1999 | Shoemaker | 43/139 |
| 5,915,950 | * 6/1999 | Kleinhenz | 43/139 |

FOREIGN PATENT DOCUMENTS

| | | |
|---|---|---|
| 2236467 | 10/1991 | (GB) . |
| 2191376 | 12/1997 | (GB) . |
| 116241 | * 1/1947 | (SE) ................................. 43/112 |
| WO 84/00280 | * 2/1984 | (WO) ................................. 43/139 |

* cited by examiner

Primary Examiner—Darren W. Ark
(74) Attorney, Agent, or Firm—Curtis L. Harrington

(57) ABSTRACT

A dedicated, vacuum operated, electrical capture device has a shaped capture housing having an inner rim carrying conductors for killing or stunning a pest, to cause the pest to release itself from its position on a surface, and a vacuum suction motor assembly to pull the pest through a telescoping section to a final section of tubing which is accessible to facilitate disposal of the pest. A pest collection compartment situated along the air intake tube includes a flexible door for convenient disposal of the collected pests. The pest collection compartment preferably contains a transparent section so that the user can know when the pest has been withdrawn into the device, will know that the pest is dead, and so that the user can dispose of the pest, preferably without touching it.

17 Claims, 3 Drawing Sheets

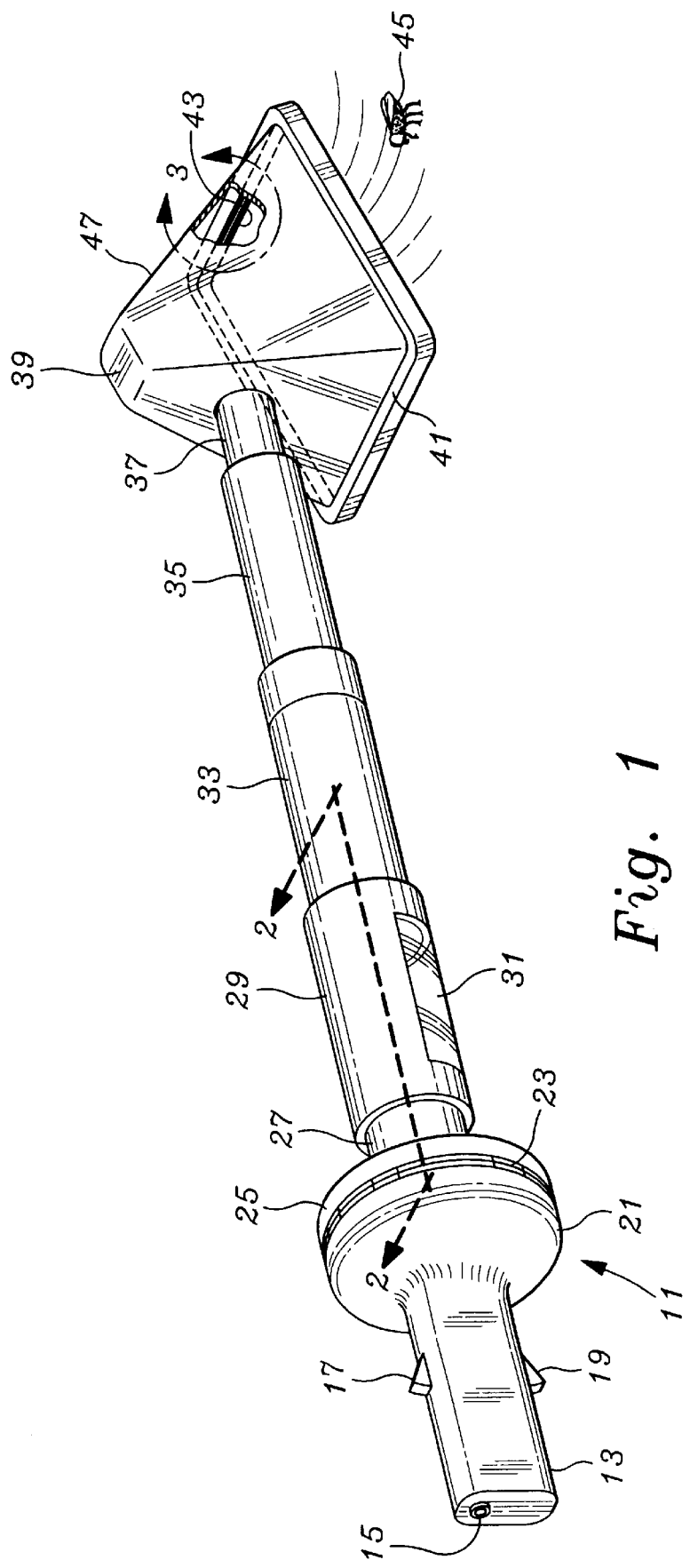

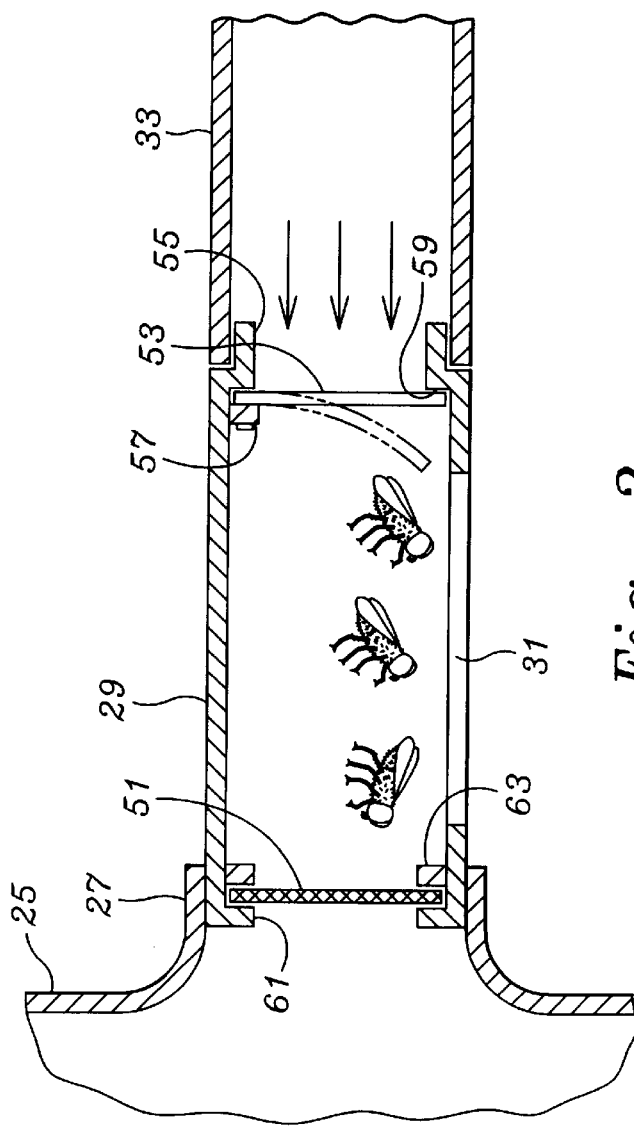
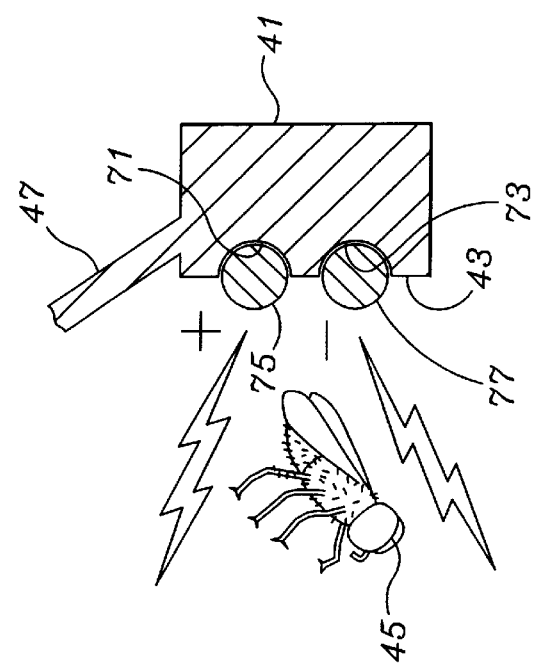

PORTABLE ELECTRIC VACUUM WIRED TO TERMINATE AND DISPOSE OF PESTS

FIELD OF THE INVENTION

The present invention relates to the field of household pest collection and elimination and more particularly to a light weight small vacuum driven and electrically operated pest collection tool which electrically kills the pests, displays them and enables them to be safely disposed.

BACKGROUND OF THE INVENTION

Conventional vacuum cleaners are often used for removing some insect pests in narrowly defined circumstances. These circumstances may arise where the household vacuum is already deployed and plugged in. In this case, the user might be able to use the vacuum suction to pull the pest into the conventional vacuum cleaner storage, but only with a combination of a powerful vacuum and an insect or pest which does not cling tightly to the wall or other surface can give passable results. In addition, a conventional vacuum cleaner may not have a hose with an acceptable level of "reach" without having to add special attachments, detaching the floor sweeper, and will probably require the main vacuum unit to be lifted in an attempt to reach the pest. Where the pest refuses to let go, severe movement of the nozzle or tip can cause the pest to be crushed against the wall or other surface to produce discoloration and a mess to clean up. Further, where the insect is of sturdy size or hardness, even where it is sucked up into the machine, it may crawl out of the vacuum cleaner when the vacuum cleaner is shut off. In some cases, the creature may hang in the vacuum tube and crawl out sooner than later.

The above problems with conventional vacuums including their bulk and other limitations produce the need for a pest disposal device which brings ease of use, ease of storage and positive indications of capture and disposal to set the mind of the user at ease that the pest will not re-emerge. In addition, for pests which cling to the surface on which they are found, a method is needed which will cause them to release from their stuck position which will not necessitate significant physical force and motion which would risk crushing the pest and soiling the surroundings. In addition, device is needed in which very little weight overall is imposed on the user, and with very little weight on a far end which is capable of reaching the pest, both to make things easier for the user, as well as to reduce the risk of crushing the pest.

SUMMARY OF THE INVENTION

A dedicated, vacuum operated, electrical capture device has a shaped capture housing having an inner rim carrying conductors for killing or stunning a pest, to cause the pest to release itself from its position on a surface, and to enable even a modest suction to pull the pest through a telescoping section to a final section of tubing as a pest collection compartment which is accessible to facilitate disposal. This pest terminator-collection-disposal device includes an electrically driven device for establishing an air stream in an air duct forming at least a segment of a housing for the device. A pest collection compartment situated along the air intake tube with door for convenient disposal of the collected pests. The collection compartment preferably has an elongated body having a flexible closure structure and a filter structure. The closure structure preferably deflects under the influence of an air stream from a closed position to provide an entrance thereto for insects entrained in the air stream. The filter structure separates insects from the air stream and isolates them from the machine establishing the air stream. Upon termination of air flow, the flexible closure member is restored to an initial position to entrap the pest between the flap and filter structure. The duct in one embodiment includes an expandable and retractable array of elongated telescoping members. At one end of the embodiment, the shaped capture housing, referable as a "catch dome" includes a set of spaced apart conductors for operation with positive and negative polarity DC current. The now dead insect, which can not pose any struggle even when a limited vacuum is applied by pressing the vacuum button, is simply sucked into the pest collection compartment which is at or near and possibly part of a final tube section. To dispose the remains of the pest, the pest collection compartment can be brought immediately above a garbage can, where the user can then simply open the disposal door on the body of the collection compartment to dispose the remains of the pest. The pest collection compartment preferably contains a transparent section so that the user can know when the pest has been withdrawn into the device, will know that the pest is dead, and so that the user can dispose of the pest, preferably without touching it. The rear of the portable electric vacuum of the invention includes a handle, control switches and a vacuum motor which utilizes a radial exhaust method in order to minimize expelled air from disruption of the surroundings, so a not to blow papers, etc. The section which expels air also acts as a hilt with respect to the handle to facilitate positive manual control and ease of use. An internally operated shock system applies a shocking voltage between two spaced apart conductors about the inside periphery of the shaped capture housing. The use of the shock voltage is optional. If desired, the user can position the capture housing inner periphery near the pest, and press one of the two buttons on the rear handle to deliver a jolting discharge between the two spaced apart conductors located at the inner periphery of the shaped capture housing, either at the beginning of the capture process, or where a first capture reveals a pest which is stubbornly holding onto a surface at his location. The user, while operating the vacuum system of the invention, can observe the pest's passing into the pest collection compartment at which time the capture operation is indicated as being finished. Hand switches then move off of the vacuum and shocking buttons, the pest collection compartment can then be removed and emptied. The ability to physically insure that the pest is dead is of significant comfort to the user and permits inside the house disposal without having to worry about re-emergence of the pest from the waste container.

BRIEF DESCRIPTION OF THE DRAWINGS

The invention, its configuration, construction, and operation will be best further described in the following detailed description, taken in conjunction with the accompanying drawings in which:

FIG. 1 is a side rear perspective view of one possible physical realization of a pest collecting, killing and disposal vacuum of the present invention;

FIG. 2 is a cross sectional view taken along line 2—2 of FIG. 1 and illustrating details of the pest collection compartment;

FIG. 3 is a sectional view taken along line 3—3 of FIG. 1 and illustrating details of the conductors extending around the periphery of the shaped capture housing;

DETAILED DESCRIPTION OF THE PREFERRED EMBODIMENT

Figure 4:
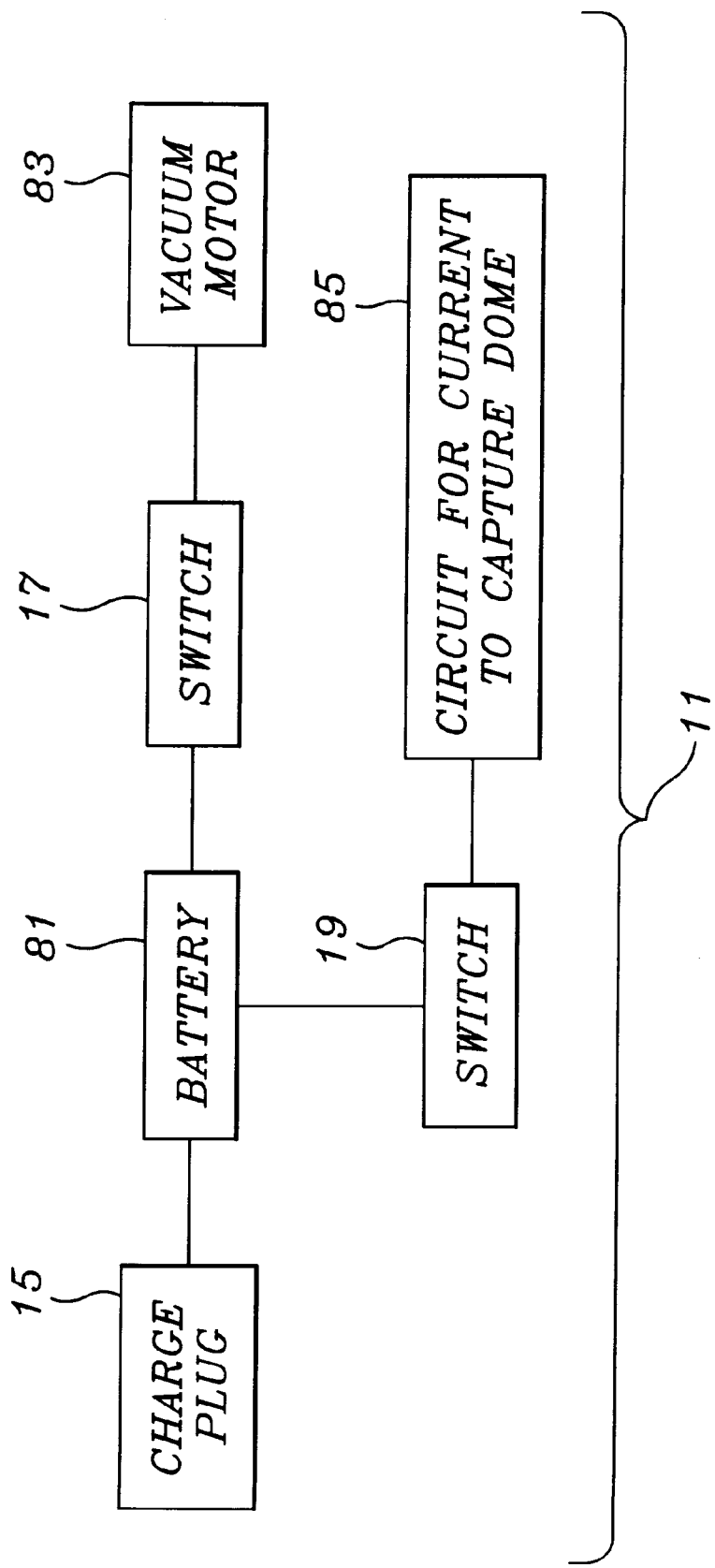
FIG. 4 is a block diagram illustrating the electrical components of the invention and their interrelationship.

The description and operation of the invention will be best initiated with reference to FIG. 1 and which illustrates a frontal view of a pest collecting, killing and disposal vacuum, hereinafter pest vacuum 11 of the present invention. Beginning at the rear left end, a handle 13 can include an internal space for storage of conventional batteries or rechargeable batteries. The batteries in the handle provide advantageous balance to the pest vacuum 11 and enable it to be manipulated easily. An optional charging plug 15 may be provided so that the pest vacuum 11 can charge when not being immediately used.

On either side of the handle 13 are a pair of control buttons, including a first button 17 and a second button 19. The buttons 17 and 19 are generally oppositely disposed and are shown to be pivoting buttons to insure that even a user who is frail can both operate and hold in operation the buttons 17 and 19 with minimal effort. The handle has a cross sectional oblong shape for comfort and, with the positioning of the buttons 17 and 19, allows the pest vacuum to be used either left, or right handed. For example, where a user prefers to use button 17 as a thumb switch for an internally operated vacuum motor and the switch 19 as a trigger for the application of DC current, this is facilitated. If the user wishes to reverse so that the index finger operates the vacuum motor and the thumb is to be used to apply the DC current, the handle 13 need only be rotated.

At the upper end of the handle a radially expanded rear portion 21 of the housing acts as a hilt and helps to secure ease of manual manipulation of the handle 13. Near a midline of the radially expanded portion 21 is a slot 23. It is preferable for the exhaust of an internally operated vacuum motor to expel the air moved to create vacuum or air movement in a radial manner to avoid directing a significant volume of exhaust air in any direction.

Forward of the slot 23 is a radially expanded forward portion 25 which leads to a tube section 27 which may be formed integrally with the radially expanded forward portion 25. Tube section 27 is attached to a pest collection compartment 29 which may preferably have a clear section 31. Pest collection compartment 29 can be wholly transparent if desired. Forward of the pest collection compartment 29 is a telescoping tube set including tube sections 33, 35, and 37. More sections may be utilized depending upon the length of reach or rigidity of materials used, as well as a desired stowed length. At the end of the forward most section tube section 37, a capture dome 39 is situated.

Ideally, the tube sections 33, 35, and 37 and the capture dome 39 can pivot about the axial length of the pest vacuum 11. This facilitates rapid positioning of the capture dome 39, to either accommodate different orientations of the handle 13, or for side wall and hard-to-reach places. The capture dome 39 includes a stepped outer periphery structure 41, and has an inner wall 43 which can be brought near a pest 45 illustrated as a winged fly. Lines of suction near the outer periphery illustrate the operation of the vacuum suction and air flow into the capture dome 39. The capture dome 39 overall extent is typically a thin wall 47 to provide light weight. If the inner wall 43 of the outer periphery structure is brought near the pest 45 as by a gentle sweeping motion over a non-moving pest 45, it can produce an electric current through the pest 45 body to cause death. If the pest 45 flies within the capture dome 39 it will be certainly sucked into the tube section 37 and rearward into the pest collection compartment 29. As shown in FIG. 1, the tube section 27 is shown as being overfit by the pest collection compartment 29, as is tube section 33.

Referring to FIG. 2, an alternate connection arrangement is combined with a view of the internals of the pest collection compartment 29, including a rear filtering screen 51 and a forward flexible closure member 53. The flexible closure member 53 should have the ability to flex under the influence of a slight vacuum or slight air flow so as to not create pressure drop between the suction device within structures 21 and 25. In addition, the flexible closure member should have the ability to flex many times without being deformed permanently in a flexed or non-sealing position. In FIG. 2, the flexible closure member 53 is also seen in flexed position drawn in dashed line format.

In FIG. 2, the pest collection compartment 29 is shown as having a forward radially inwardly shaped section 55 which interfits with an ordinary rear shape of the tube section 33. The forward radially inward shape helps isolate the flexible closure member 53, as well as to provide a surface from which the flexible closure member 53 is to be mounted. As is seen a mounting fixture 57 is seen which may be a bolt or attachment fitting or other structural member. In addition, the radially inwardly situated section 55 provides an internal circular groove 59 against which the flexible closure member 53 may advantageously seal when the pest vacuum 11 is not in use.

Since the rear filtering screen 51 has no movement, it may be secured against a radially inwardly disposed lip 61 using a ring 63 which may be press fit or glued, welded, bonded, etc. into place. The fit of the rear of the pest collection compartment 29 into the section 27 may be detachable or permanent. However, the radially inwardly situated section 55 has a sufficiently long axial length to provide both fit and support from the pest collection compartment 29 with respect to all of the structural members forward of the pest collection compartment 29.

Referring to FIG. 3, a section of the capture dome 39 taken along line 3—3 of FIG. 1 illustrates the thin wall 47 leading to the stepped outer periphery structure 41, and the oppositely disposed inner wall 43 of the stepped outer periphery structure 41. The inner wall 43 carries a pair of grooves 71 and 73, which accommodate a conductor 75 and a conductor 77, respectively. In practice, the conductors 75 and 77 may be press fit, sonic welded, or formed at the same time as the outer periphery structure. The important aspect is that the conductors 75 and 77 have an exposed surface so that flow of current through the body of a pest 45 will not be impeded by other material. Thus the capture dome 39 and the stepped outer periphery structure 41 will be made of non conducting material, of appropriate dielectric strength to cause the flow of current through the pest 45 body to predominate.

Referring to FIG. 4, a block diagram illustrates the components within the pest vacuum 11. At the left a block representing the charge plug 15 seen in FIG. 1 is shown. Charge plug 15 is connected to a BATTERY 81 which supplies power to the other electrical components of the pets vacuum 11. A block representing switch 17 seen in FIG. 1 connects the BATTERY 81 to a VACUUM MOTOR 83 which may be a blower or other air moving device. Switch 19 is also connected to BATTERY 81 and to a CIRCUIT FOR CURRENT TO CAPTURE DOME block 85 which represents typically a voltage boosting circuit for providing higher voltage direct current to the conductors 75 and 77, as well as the conductors which carry the current to the conductors 75 and 77 seen in FIG. 3.

While the present invention has been described in terms of a pest vacuum with air flow collection, electrical current killing capability as well as viewable isolated collection and disposal capability.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A pest collection device comprising:
    a manually manipulatable housing which comprises a handle section, a radially projecting section adjacent and extending evenly radially outward from and forward of said handle section, a pest collection section adjacent said radially projecting section, a tubular extension section having a first end connected adjacent said pest collection section, and wherein said tubular extension section contains at least two telescoping sections, and a second end, and a capture dome attached to said second end of said tubular extension section, wherein said capture dome has an opening;
    a battery power source supported within said housing;
    a vacuum motor;
    a vacuum motor switch connected to said battery power source and said vacuum motor for operating said vacuum motor;
    an applied current circuit for providing current to pests in a position near said opening;
    an applied current switch connected to said battery power source and to said applied current circuit for operating said applied current circuit.

2. The pest collection device as recited in claim 1 wherein said capture dome has an inner periphery including electrical conductors operated by said applied current circuit.

3. The pest collection device as recited in claim 1 wherein said battery power source is carried within said handle section.

4. The pest collection device as recited in claim 1 wherein said vacuum motor is carried within said radially projecting section.

5. The pest collection device as recited in claim 1 wherein said applied current circuit further comprises a positive polarity electrical wire and a negative polarity electrical wire spaced apart from said positive polarity electrical wire, both said positive and negative polarity electrical wires encircling said opening of said capture dome.

6. The pest collection device as recited in claim 1 wherein said pest collection section is detachable from said tubular extension section to enable pests within said pest collection section to be removed.

7. The pest collection device as recited in claim 1 wherein said pest collection section is at least partially transparent to permit viewing of pests within said pest collection section.

8. The pest collection device as recited in claim 1 wherein said vacuum motor switch and said applied current switch are located on said handle section.

9. A pest collection device comprising:
    a manually manipulatable housing comprising a handle section, a radially projecting section adjacent and extending evenly radially outward from a longitudinal axis of said handle section and forward of said handle section, a pest collection section adjacent said radially projecting section, wherein said pest collection section further comprises a tube having a first end and a second end nearer said radially projecting section, a screen fitted near said second end of a mesh size large enough to pass flowing air and small enough to entrain pests, and a flexible member near said first end positioned to flex open to admit flowing air to said pest collection section and which naturally springs closed in the absence of flowing air to enclosably capture pests within said pest collection section when no air is flowing, a tubular extension section having a first end connected adjacent to said first end of said pest collection section and a second end, and a capture dome attached to said second end of said tubular extension section, wherein said capture dome has an opening;
    a battery power source supported within said housing;
    a vacuum motor;
    a vacuum motor switch connected to said battery power source and said vacuum motor for operating said vacuum motor;
    an applied current circuit for providing current to pests in a position near said opening;
    an applied current switch connected to said battery power source and to said applied current circuit for operating said applied current circuit.

10. The pest collection device as recited in claim 9 wherein said capture dome has an inner periphery including electrical conductors operated by said applied current circuit.

11. The pest collection device as recited in claim 9 wherein said battery power source is carried within said handle section.

12. The pest collection device as recited in claim 9 wherein said vacuum motor is carried within said radially projecting section.

13. The pest collection device as recited in claim 9 wherein said applied current circuit further comprises a positive polarity electrical wire and a negative polarity electrical wire spaced apart from said positive polarity electrical wire, both said positive and negative polarity electrical wires encircling said opening of said capture dome.

14. The pest collection device as recited in claim 9 wherein said pest collection section is detachable from said tubular extension section to enable pests within said pest collection section to be removed.

15. The pest collection device as recited in claim 9 wherein said pest collection section is at least partially transparent to permit viewing of pests within said pest collection section.

16. The pest collection device as recited in claim 9 wherein said vacuum motor switch and said applied current switch are located on said handle section.

17. A process of collecting pests comprising the steps of:
    bringing an opening of a capture dome of a pest collection device having a tubular extension section and a pest collection compartment near a pest to be captured;
    operating a vacuum motor to pull said pest into said capture dome, through said tubular extension section and into said pest collection compartment,
    removing said tubular extension section from said pest collection compartment and disposing of said pest; and
    operating an applied current circuit for providing current to said pest when said pest is in a position near said opening of said capture dome to cause said pest to release from said position.

* * * * *